COLOR TELEVISION RECEIVING AND REPRODUCING SYSTEM

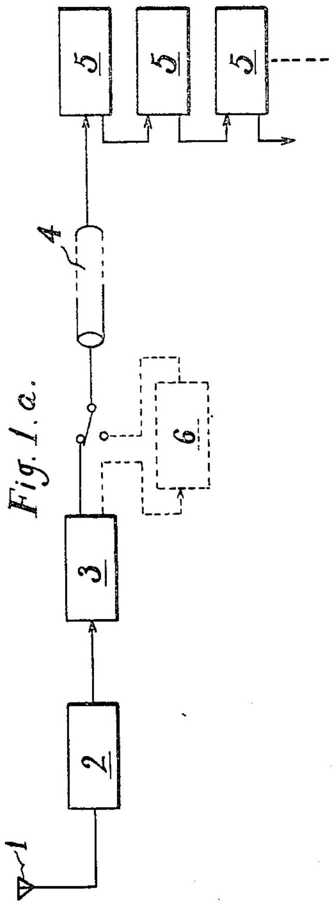
Fig. 1. a.
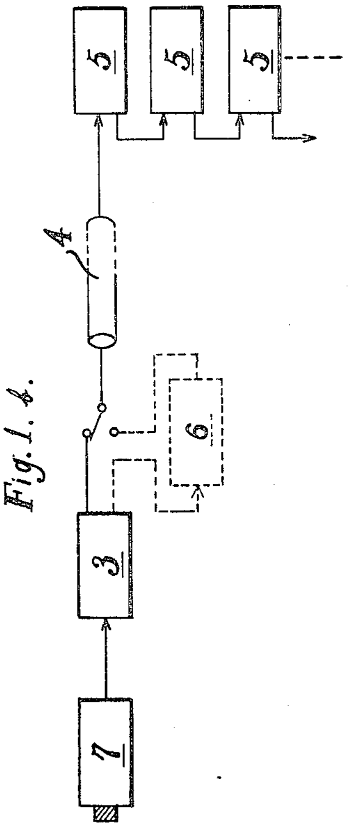
Fig. 1. b.
INVENTOR
YASUMASA SUGIHARA
By Linton and Linton
ATTORNEYS INVENTOR
YASUMASA SUGIHARA
By Linton and Linton
ATTORNEYS Dec. 16, 1969 YASUMASA SUGIHARA 3,484,545

Filed Dec. 27, 1965 7 Sheets-Sheet 3

INVENTOR
YASUMASA SUGIHARA
By Linton and Linton
ATTORNEYS

INVENTOR
YASUMASA SUGIHARA
By Linton and Linton
ATTORNEYS

INVENTOR
YASUMASA SUGIHARA
By Linton and Linton
ATTORNEYS

COLOR TELEVISION RECEIVING AND REPRODUCING SYSTEM

Filed Dec. 27, 1965 7 Sheets-Sheet 6

INVENTOR
YASUMASA SUGIHARA
By Linton and Linton
ATTORNEYS

Dec. 16, 1969 YASUMASA SUGIHARA 3,484,545

COLOR TELEVISION RECEIVING AND REPRODUCING SYSTEM

Filed Dec. 27, 1965 7 Sheets-Sheet 7

INVENTOR
YASUMASA SUGIHARA
By Linton and Linton
ATTORNEYS

United States Patent Office 3,484,545

Patented Dec. 16, 1969

3,484,545

COLOR TELEVISION RECEIVING AND REPRODUCING SYSTEM

Yasumasa Sugihara, Kawasaki-shi, Japan, assignor to The General Corporation, Kawaski-shi, Kanagawa-ken, Japan, a corporation of Japan Filed Dec. 27, 1965, Ser. No. 516,611
Claims priority, application Japan, Dec. 30, 1964, 39/74,412
Int. Cl. H04n 5/44
U.S. Cl. 178—5.4 3 Claims This invention relates to systems for reproducing a color image signal information and has particular reference to a community receiving system utilizing color television receivers of the line-sequential type.

The so-called community television reception is now widespread, and there have been proposed some methods therefor, a typical example of which comprises storing the desired broadcast programs in a magnetic tape recording apparatus and transmitting the selected program information therefrom to a number of individual television sets installed in a specific place such as school, hospital, department store, hotel, airplane, train, bus, etc. However, such methods are effective for the reproduction of monochrome information but are not satisfactory for handling a color television information carried on an extremely high signal frequency band.

Attempting to transmit a color television signal such as for example the NTSC signal to receivers mounted, for example, on an airplane travelling far away from the transmitting station would result in poor reproduction of the picture due to phase distortion or delay characteristic of the color signal. If the brightness component of the NTSC composite signal were to transmit separately from the chrominance component, it would require at least four costly transmission cables. In addition, as the color television signal has an extremely high frequency band, it would require a high frequency amplifier to amplify the signal before reception on the television receivers located far from the transmitter. There must also be considered the problem of undesirable high frequency radiations which affect other communications equipment near at hand.

Whereas, it is an object of this invention to provide a novel color television reproducing system which will eliminate the above-noted difficulties.

It is another object of the invention to provide improved color television reproducing system which will permit faithful reproduction of the color television signal on color television sets located beyond the commercial range of transmission from the transmitting station.

It is a further object of the invention to provide improved method of converting the color image signal of various standards into a line-sequential type of signal to be readily reproduced on a line-sequential type color television receiver located remote from the transmitter.

It is still another object of the invention to provide a community color television receiving system operating on the principles just mentioned in the foregoing object and utilzing relatively low-cost color television receivers.

These objects and features of the invention will become more apparent from the following description taken in connection with the accompanying drawings, in which:

FIG. 1–*a* and FIG. 1–*b*, respectively, illustrate the general arrangements for reproduction of the color television signal embodying the invention;

Figure 2:
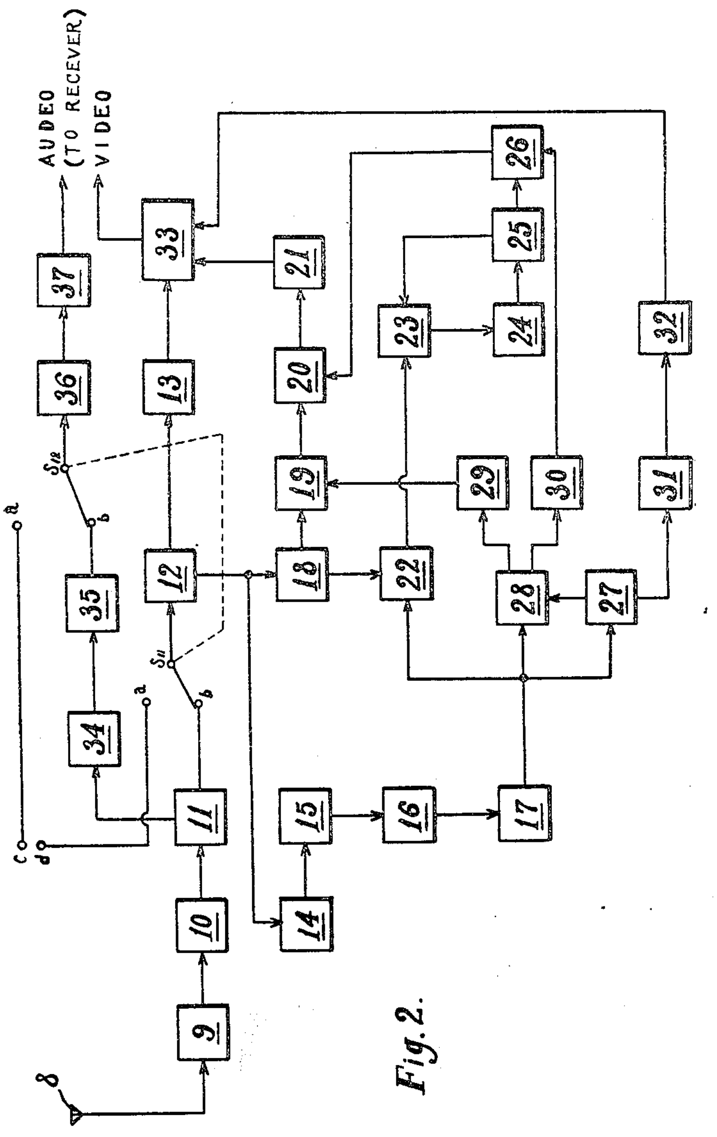
FIG. 2 is a block diagram illustrating a circuit arrangement for the formation of a line-sequential color television signal according to the invention.

Reference is first had to FIG. 1–*a* which shows one embodiment of the invention in which the NTSC signal on broadcast is processed for reproduction on a line-sequential type television receiver. The incoming NTSC signal is received by antenna 1 and into a receiving apparatus 2 which operates on the principles of a line-sequential system. The signal thus received is converted into a line-sequential color image signal by a converter 3 and applied via transmission cable 4 to each individual receiver 5. These receivers 5 are a line-sequential color television receiver of the type described later herein.

It will be appreciated that the NTSC signal when converted into the line-sequential color image signal comes within the same frequency bandwidth with an ordinary monochrome image signal and can be, therefore, readily recorded on a magnetic tape recording apparatus 6 capable of handling a black/white image information.

FIG. 1–*b* illustrates another embodiment of the invention in which the NTSC signal televised and transmitted from a color television camera 7 is applied to the signal converter 3 for conversion into a line-sequential type signal and then applied via cable 4 to a plurality of color television receivers 5 of the line-sequential system. The thus converted color television signal may also be recorded on the magnetic tape recorder 6.

The invention will be discussed in more detail with reference to FIG. 2 and in connection with the NTSC signal. The system shown in FIG. 2 corresponds to the NTSC signal receiving unit 2 and the line-sequential signal converter 3 of FIG. 1–*a*. Designated at 8 is a receiving antenna; at 9 is a tuner circuit comprising an input circuit, a high frequency amplifier, a high frequency converter and a local oscillator; at 10 is an intermediate frequency amplifier and at 11 is a video detector. The circuits 8 through 11, inclusive, just mentioned are required to detect the NTSC color composite video signal from the incoming broadcast radio wave and are similar to those built into an ordinary color television receiver.

For introducing the incoming color image signal directly into the system of the invention, there are provided switches $S_{11}$ and $S_{12}$ which are adapted to contact a terminal a thereby applying an audio signal to a terminal *c* and a video signal to a terminal *d*.

Designated at 12 is a video amplifier from which the pertinent signals are distributed to a synchronizing signal separator, a chrominance signal circuit and a brightness signal circuit. Designated at 13 is a brightness signal amplifier; at 14 is a synchronizing signal separator; at 15 is a synchronizing signal amplifier; at 16 is an AFC and horizontal oscillation circuit, and at 17 is a horizontal pulse shaper. The circuits 14 through 17, inclusive, just mentioned are well known in the art and hence, will require no further description.

Designated at 18 and 19 are bandpass amplifiers; at 20 is a chrominance signal demodulator; at 21 is a chrominance signal amplifier, and at 22 is a color burst amplifier. Designated at 23 through 25 are a phase-detector, a reactance circuit and a crystal oscillator, respectively, which form a loop to function as an APC circuit.

Designated at 25 is a phase-modulator adapted to produce a subcarrier which serves as a detection axis for demodulation of the chrominance signal. A frequency divider 27 is adapted to be energized by a horizontal pulse from the horizontal pulse shaper 17 and synchronize with one-third of a horizontal frequency. Designated at 28 is a storage counter to which are applied a pulse having one horizontal scanning cycle and another pulse having three horizontal scanning cycles, respectively, from the horizontal pulse shaper 17 and the ⅓ frequency divider 27, whereupon there may be obtained a pulse waveform having three steps which correspond to three horizontal scanning cycles.

Designated at 29 is a wave shaper adapted to compensate for the reduction factor of the NTSC signal, and its output is applied to the bandpass amplifier 19 to effect automatic gain control in response to the red, blue and green component signals. Designated at 30 is a circuit for shaping the modulating wave for application to the phase-modulator 26. Designated at 31 is a delay and shaper circuit for the pulse having three horizontal scanning cycles. For purposes of illustration, one horizontal scanning cycle will be referred to simply as H and three horizontal scanning cycles as 3H, as these are so shown in FIGS. 7, 8 and 10 through 13, inclusive.

Designated at 32 is a gate circuit adapted to oscillate for the duration of a 3H pulse applied from the shaper 31 and develop a color synchronizing signal for application to a matrix circuit 33. To this matrix circuit are applied a brightness signal, a line-sequential chrominance signal and a color synchronizing signal from the brightness signal amplifier 13, chrominance signal amplifier 21 and gate oscillator 32, respectively, thereby developing a new form of color image signal characteristic of the invention. The color composite video signal thus developed is transmitted to each individual color television receiver.

Designated at 34 through 37, inclusive, are an audio intermediate frequency amplifier, an audio detector, an audio amplifier and an audio output circuit, respectively. The output of this audio output circuit is also applied to each color television receiver.

Having thus described the general circuit arrangement employed to carry the invention into practice, a description will follow with particular reference to those circuits which have more direct bearing upon the invention concept of the invention.

Figure 3:
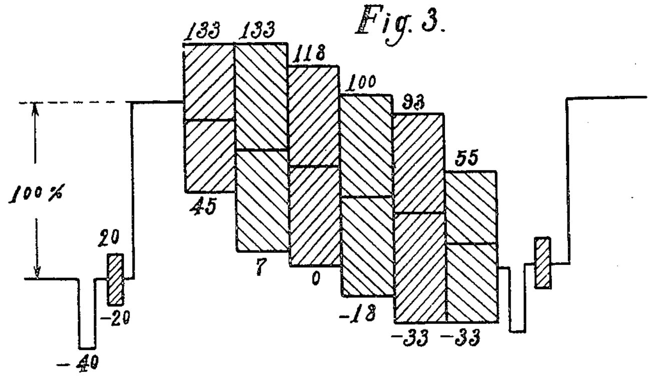
FIG. 3 is a color burst signal waveform of the brightness order.
Figure 4:
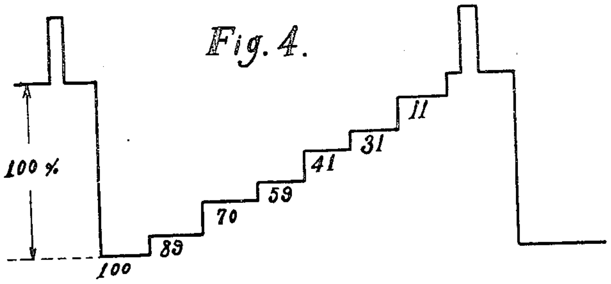
FIG. 4 is a brightness signal waveform of the color burst signal in the brightness order.
Figure 5:
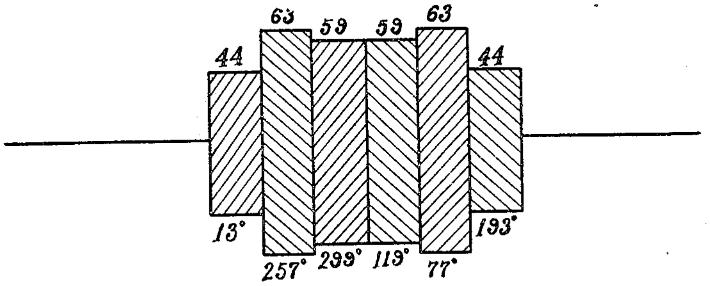
FIG. 5 is a chrominance signal waveform of the color burst signal in the brightness order.

With the color burst signal of a brightness order in FIG. 3 applied to the video amplifier 12, the output of this amplifier is applied to the brightness signal amplifier 13 and to the delay circuit for compensation of its time shift with respect to the chrominance signal. The output of the circuit 13 has such waveform as shown in FIG. 4. The bandpass amplifiers 18 and 19 having a bandwidth of about ±500 kilocycles are adapted to derive and amplify the chrominance component from the composite video signal. Waveform of the output of the amplifier 19 is illustrated in FIG. 5.

The color burst signal is blanked out by a horizontal blanking pulse. The circuits designated at 22 through 25, inclusive, are well known in the art and hence, will require no further description.

Figure 6:
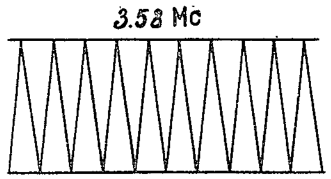
FIG. 6 is a 3.58 megacycle subcarrier waveform.
Figure 7:
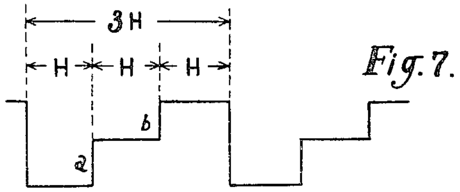
FIG. 7 is a modulating signal waveform utilized for phase-modulation.
Figure 8:
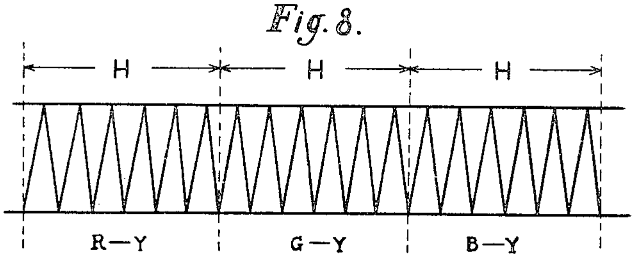
FIG. 8 is a line-sequential subcarrier waveform having a detection axis for demodulation of the chrominance signal.
Figure 9:
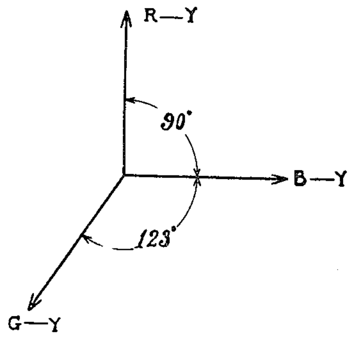
FIG. 9 is a vector diagram illustrating the detection axis of the subcarrier of FIG. 8 utilized for demodulation of the chrominance signal.

Output of the crystal oscillator 25 is a 3.58 megacycle subcarrier such as shown in FIG. 6 which is phase-modulated by a stepped-waveform pulse of FIG. 7 through the phase modulator 25. Design considerations have been given so that the output of the phase-modulator 25 undergoes phase-modulation in a stepped, cascade fashion for every horizontal scanning cycle and has a phase coincidental with the axis of detection of the chrominance signal, as illustrated in FIGS. 8 and 9.

The stepped waveform of FIG. 7, which are used for phase-modulation, has three steps different in height which are formed by the ⅓ frequency divider 27, storage counter 28 and modulating wave shaper 30.

Figure 10:
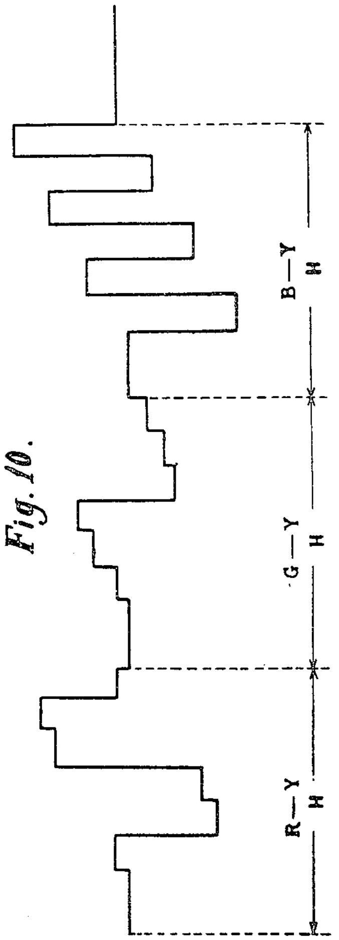
FIG. 10 is a line-subsequential chrominance signal waveform.

With the chrominance signal from the bandpass amplifier 19 and the subcarrier from the phase-modulator 26 applied to the chrominance signal demodulator 20, there may be obtained a line-sequential chrominance signal such as shown in FIG. 10.

Figure 11:
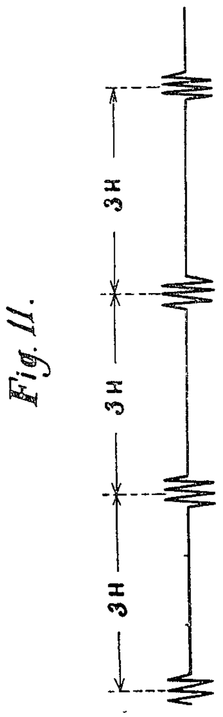
FIG. 11 is a new color burst signal waveform.

Output of the gate oscillator 32, as already mentioned, serves as a color burst for the new color video signal and has a cycle corresponding to three horizontal scanning cycles as illustrated in FIG. 11.

Figure 12:
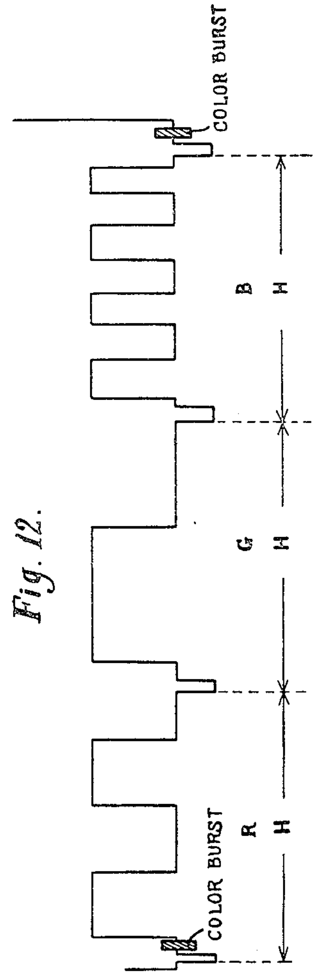
FIG. 12 is a color burst signal waveform representing a new composite color image signal.

Applying the three different signals, respectively shown in FIGS. 4, 10 and 11, to the matrix circuit 33 for adjustment of their amplitudes and phases, there may be obtained a composite color video signal such as illustrated in FIG. 12. This signal is transmitted via cable 4 to each individual color television receiver 5 according to the invention. At this composite video signal comes within the same frequency band with the ordinary monochrome image signal, it may be readily recorded on a monochrome magnetic tape recording/reproducing apparatus 6.

Figure 14:
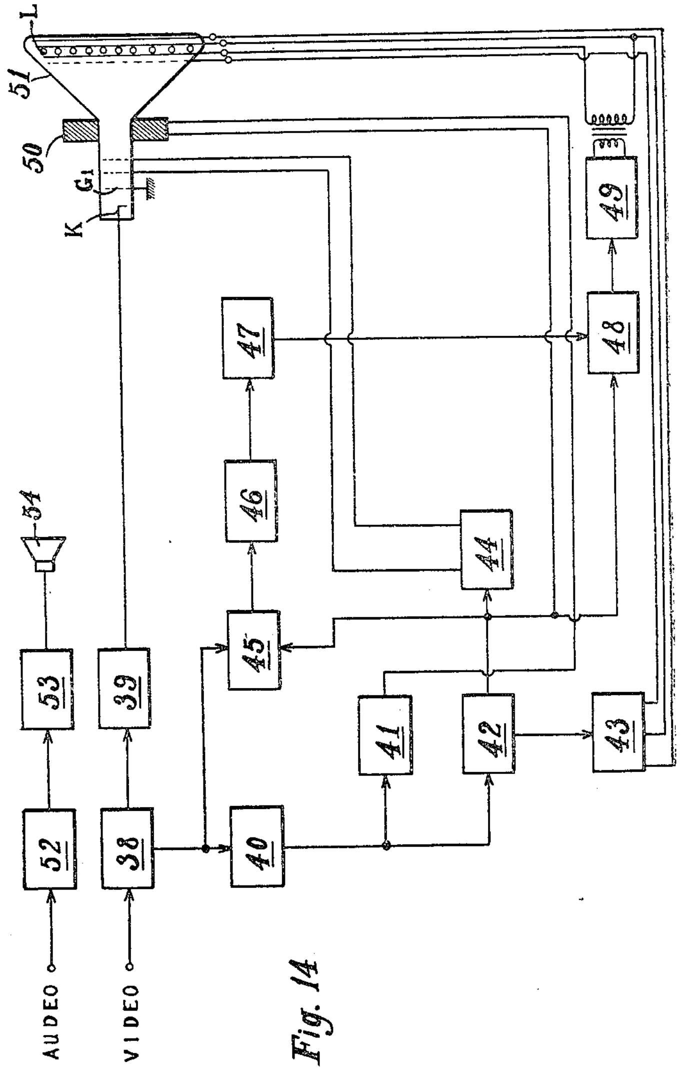
FIG. 14 is utilized to illustrate a receiver arrangement embodying the invention for reproducing a line-sequential color television signal.

FIG. 14 illustrates the main circuitry of line-sequential type color television receiver used in the reproducing system of the invention. The receiver according to the invention should preferably be of the type having a single-electron gun picture tube with an image screen comprising a plurality of regularly aligned narrow strips of phosphor carrying three different colors, each of which phosphor strips being assigned to reproduce one of the three primary colors when impinged upon by electron beams. Immediately before the image screen there is provided a deflection device which is adapted to cause the electron beam to deflect more extensively from one phosphor strip to another thereby to select the color to be reproduced. More specifically, the electron beam deflection unit comprises a plurality of slender conductor strips kept properly taut and parallel to the phosphor strips, said conductors being separated to two groups by electrically insulating adjacent conductors and electrically connecting every other conductors thereby forming a grid structure or color control grid L. With certain potential held between the two groups of conductors in such color control grid, the electron beam is caused to deflect from one phosphor strip to another. The electron beam emitted from the gun is subjected, prior to arrival at the color control grid L, to vertical and horizontal deflection in the presence of a magnetic or electric field thereby to develop a raster to be reproduced, the brightness of which being controlled by the potential between the cathode of the gun and the first grid.

The color television receiver of the above construction is utilized to reproduce the line-sequential type color video signal according to the invention. Referring now to FIG. 14, the receiver comprises video amplifiers 38 and 39, a synchronizing signal separator and amplifier 40, a vertical oscillation and deflection circuit 41, an AFC horizontal oscillation and deflection circuit 42, a high voltage generator 43, a screen and focus voltage generator, a gate circuit 45, a color synchronizing signal shaper 46, a blocking oscillator 47, a storage counter 48, a color switching output circuit 49 and a deflection yoke 50 adapted to be energized by the outputs of horizontal deflection circuit 42 and vertical deflection circuit 41. Designated at 51 is a single-electron gun type of picture tube; at 52 is an audio amplifier 52; at 53 is an audio output circuit, and at 54 is a speaker.

The color composite image signal incorporating a color burst signal of the type shown in FIG. 12 is amplified at the video amplifiers 38 and 39 for application to the cathode K or the first grid $G_1$ of the picture tube 51 to control the beam emitted from the gun.

Since the circuits 40 through 44, inclusive, are well known in the usual television receiver, they will require no further description.

Figure 13:
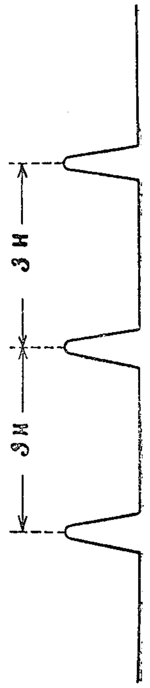
FIG. 13 is a color synchronizing signal obtained by envelope-detection of a color burst signal.

There may be provided a suitable bandpass filter at the input of the gate circuit 45 for admitting the color burst signal alone, while the gate pulse from the circuit 42 is derived for application to the gate circuit 45 so that there may be obtained a color burst signal having a cycle corresponding to three horizontal scanning cycles (3H). This color burst having such waveform as shown in FIG. 11 is applied to the color synchronizing signal shaper 46 thereby effecting envelop-detection of the composite image signal, with the result that there may be obtained a color synchronizing signal having a cycle corresponding to three horizontal scanning cycles (3H) as shown in FIG. 13. This synchronizing signal may be used as it is or after being applied to the blocking oscillator 47.

The H pulse and 3H pulse obtained from the horizontal deflection circuit 42 and blocking oscillator 47, respectively, are applied to the storage counter 48 which develops a waveform having three steps. This stepped waveform is applied to the color switching output circuit 49 and, after being amplified, to the color control grid L of the picture tube 51. Each step in the waveform of the storage counter output shares one of the three primary colors for every scanning line. For example, the first step may be assigned to share the red color component; the second step to share the green, and the third step to share the blue component of the primary colors. It follows that a raster to constitute a frame of picture is formed with scanning lines each representing a specific one of the three primary colors.

Since the brightness signal, line-sequential chrominance signal and synchronizing signal are mixed and converted to a composite color image signal of line sequence, the resulting color image signal information may be transmitted without substantial attenuation to remotely located receivers of the type described herein. The line-sequential color image signal according to the invention comes within a relatively narrow bandwidth comparable to a monochrome image signal bandwidth, and hence the amplifier which may be required intermediate between the transmitter and the receiver can be of a relatively narrow band.

Having thus described the invention, it will be appreciated that the NTSC or other standard color television signals may be easily reproduced through a less costly equipment comparable to an ordinary monochrome image reproducing apparatus.

What is claimed is:

1. A color television receiving and reproducing system comprising: a simultaneous color television receiver adapted to receive an N.T.S.C. signal including a chrominance component and a luminance component; a signal converter adapted to demodulate said color signal sequentially at each horizontal period by means of a phase-detection axis corresponding to a phase axis of said color signal and to convert said color signal into a line-sequential type signal including three primaries of color information with a color burst signal inserted at every three horizontal periods; a transmission cable adapted to transmit the converted line-sequential signal to a color television receiver at a remote location; and a color television receiver including a cathode-ray tube of the type having a single electron gun including a color switching grid and a fluorescent screen, wherein there are provided a circuit means for deriving a color burst signal having a cycle of three horizontal periods from said line-sequential signal, and a circuit means for forming a three-stepped wave form having a cycle corresponding to three horizontal periods, said stepped wave form being supplied to said color switching grid adjacent to the fluorescent screen of said color tube, thereby switching between three primary color signals.

2. The system according to claim 1, and a monochrome video tape recorder, said converted line-hequential color image signal being recorded on a monochrome video tape recorder.

3. A color televsion receiver and reproducing system comprising: a color television camera adapted to derive a color information signal including a chrominance component and luminance component from color objects; a signal converter adapted to convert an output signal of said color television camera consisting of three different color information signals into a line-sequential type signal with a color burst signal inserted at every three horizontal periods; a transmission cable adapted to transmit the converted line-sequential type signal to a plurality of color television receivers at a remote location; and a color television receiver including a cathode-ray tube of the type having a single electron gun including a color switching grid structure, wherein there are provided a circuit means for deriving a color burst signal having a cycle of three horizontal periods from said line-sequential signal, and a circuit means for forming a three-stepped wave form having a cycle corresponding to three horizontal periods, said stepped wave form being supplied to said color switching grid adjacent to a fluorescent screen of said color tube, thereby switching between the three primary color signals.

References Cited

UNITED STATES PATENTS 3,267,207 8/1966 Okazaki et al. -------- 178—5.2

RICHARD MURRAY, Primary Examiner